US005494630A

United States Patent [19]
Eraybar et al.

[11] Patent Number: 5,494,630
[45] Date of Patent: Feb. 27, 1996

[54] METHOD OF FORMING MOLDING END

[75] Inventors: Alex Eraybar, Columbia; William J. Connolly, Elgin, both of S.C.

[73] Assignee: The Standard Products Company, Cleveland, Ohio

[21] Appl. No.: 270,039

[22] Filed: Jul. 1, 1994

[51] Int. Cl.⁶ .................................................. B29C 45/16
[52] U.S. Cl. .......................... 264/138; 156/211; 264/148; 264/266; 264/296; 428/31
[58] Field of Search ...................... 264/145, 148, 264/138, 162, 265, 266, 328.1, 250, 259, 296; 156/153, 211, 244.18, 245; 428/31

[56] References Cited

U.S. PATENT DOCUMENTS

| | | | |
|---|---|---|---|
| 4,351,868 | 9/1982 | Otani | 428/31 |
| 4,360,549 | 11/1982 | Ozawa et al. | 428/31 |
| 4,563,374 | 1/1986 | Treber et al. | 428/31 |
| 4,617,209 | 10/1986 | Ives | 428/31 |
| 4,619,847 | 10/1986 | Jackson | 264/138 |
| 4,719,067 | 1/1988 | Thiel | 264/259 |
| 4,778,550 | 10/1988 | Barton et al. | 156/211 |
| 4,911,873 | 3/1990 | Kuzuya et al. | 264/148 |
| 5,227,108 | 7/1993 | Reid, Jr. et al. | 264/266 |
| 5,262,105 | 11/1993 | Komiyama et al. | 264/259 |
| 5,419,863 | 5/1995 | Henderson | 264/266 |

*Primary Examiner*—Robert B. Davis
*Attorney, Agent, or Firm*—Harness, Dickey & Pierce

[57] ABSTRACT

A method of forming an end of an elongated molding having an extruded length having a hollow interior defined by a base and a cover with at least one rib unitary with the base and extending toward the cover in supporting relationship therewith, wherein the base is first removed from the end portion which is then placed in a mold and formed by injection thermoplastic material therein.

8 Claims, 2 Drawing Sheets

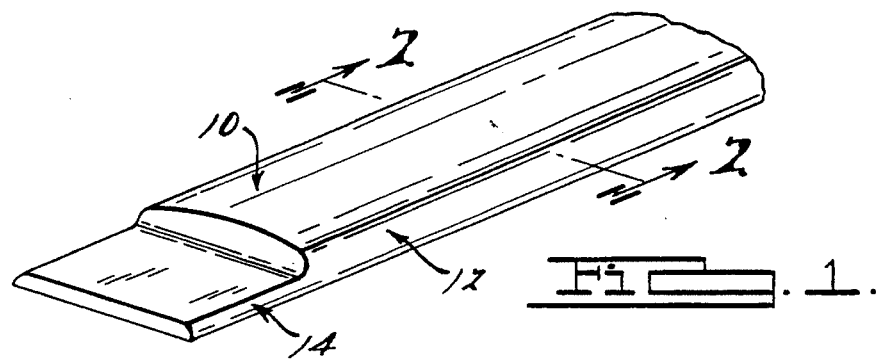
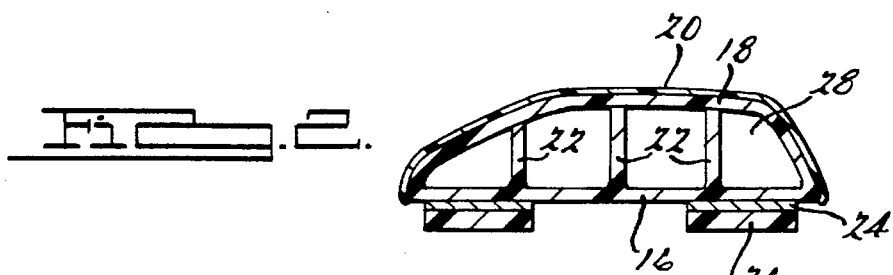
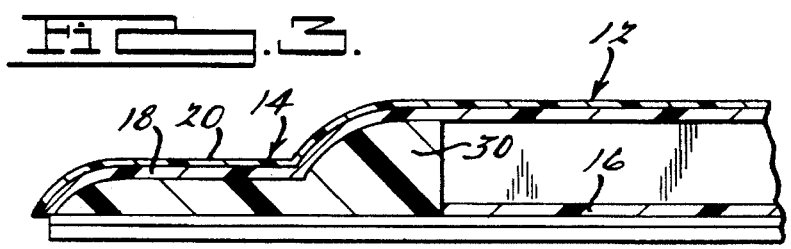
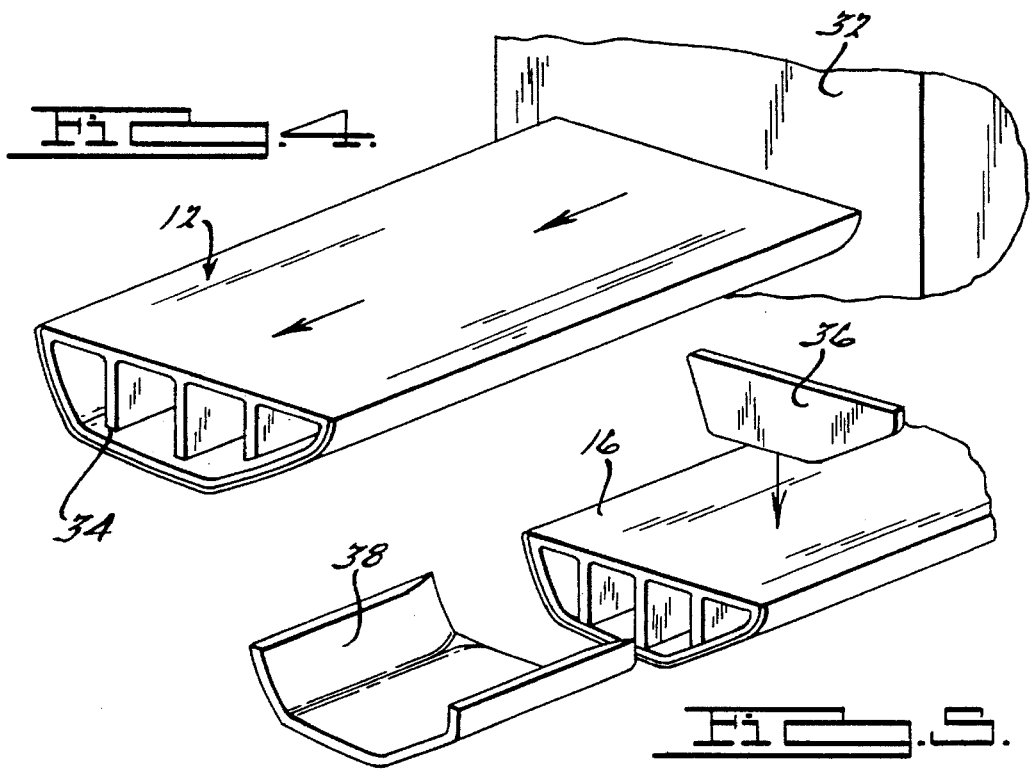

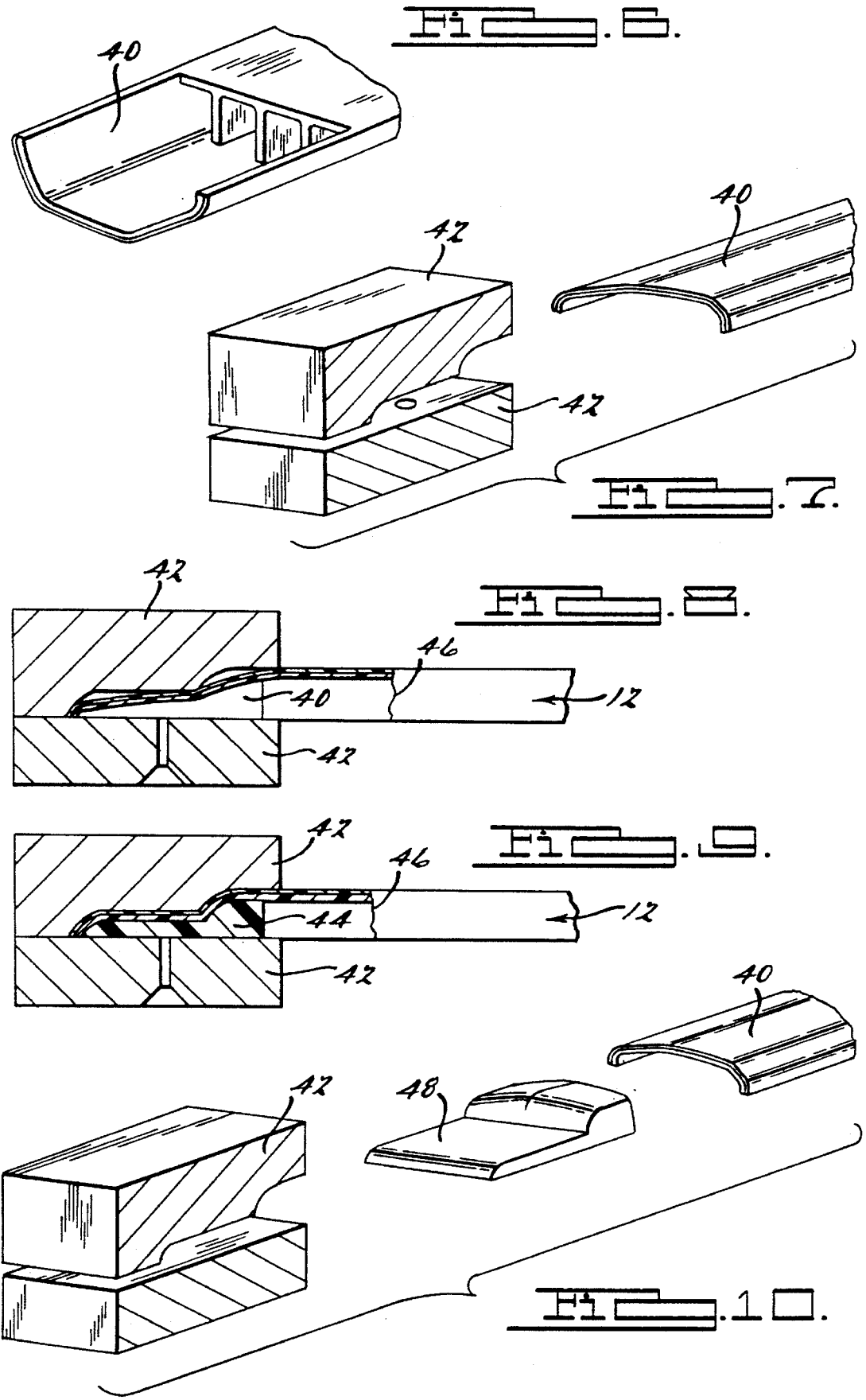

METHOD OF FORMING MOLDING END

BACKGROUND OF THE INVENTION

The present invention is directed to moldings such as decorative trim strip products made from thermoplastic extrusions. More particularly, the present invention relates to a method of forming an end of an elongated decorative and protective trim strip particularly useful as a body side molding on an automotive vehicle.

Moldings or trim strips are commonly applied as decorative and protective elements attached to automotive body panels such as door panels. While it is known to mold elongated trim strips from thermoplastic materials, moldings used in the automotive industry are generally made by extrusion because extrusion processing is capable of high production rates with relatively low tooling costs as compared to injection or other molding processes. Extrusion processing, however, incurs a disadvantage in that lengths of extrudate must be cut to provide suitable lengths for use on an automotive vehicle. Thus, the ends of such lengths generally must be finished in order to provide a smooth tapering or contoured surface which is aesthetically appealing.

A variety of approaches has been used in an attempt to provide contoured and shaped ends on extrusion formed thermoplastic strips. One approach is to separately mold an end cap onto the end of a main extrusion center section. This approach, however, provides a noticeable joint line between the molded end section and the extruded center section which is often undesirable. This approach also requires a difficult color matching to provide similar appearance between the end section and the center section. Color matching is especially difficult when metal flake colorants have been used and a molded end section is provided onto an extruded center section. Extrusion tends to orient the metal flakes in the product which is not matched by the molded end section.

Another method of forming an end section is taught in U.S. Pat. No. 5,227,108, Jul. 13, 1993 to Reid, Jr. et al. for "Method of Forming Decorative Trim Strips". In accordance with the Reid method an extruded length of thermoplastic material is first made of a length substantially equal to the desired length of the decorative trim strip with a first longitudinally extending surface of the length being a front show face and a second longitudinally extending surface opposite the first surface being a back mounting surface. Material is removed inwardly from the second surface to create a cavity behind the first surface while leaving the show face generally undisturbed. Thereafter the end portion of the extruded length with the cavity formed therein is enclosed in a mold chamber with an interior surface having the desired end shape and thermoplastic material is injected into the formed cavity to fill the cavity and force the show face of the enclosed end portion into engagement with the interior surface of the mold.

The Reid method provides an excellent method of forming contoured ends on extruded plastic strips by combining material removal and injection molding operations. The Reid method provides end portions without internal stresses and, within reason, the actual shape and contour provided on in portion can vary widely. The present invention is in the nature of a further improvement of the method of the Reid, Jr. et al. patent. Thus, the present invention provides a molding having a light weight, hollow, body and which facilitates the material removal step. Furthermore, the present invention provides a "show face" or cover layer which is easily accurately dimensioned. Further understanding of the present invention will be had from the following disclosure taken in conjunction with the accompanying drawings.

SUMMARY OF THE INVENTION

In accordance with the method of the present invention an end portion of an elongated decorative strip is provided by the steps of:

providing an extruded length of thermoplastic material having an end portion, said extruded length having a hollow interior defined by base and a cover, and said base having at least one rib extending from said base toward said cover;

removing a portion of said base and at least one rib from said end portion;

enclosing said end portion in a mold chamber with an interior surface corresponding to a desired end portion shape; and filling said mold chamber with material to force the end portion outwardly against said interior surface.

The present invention is also directed to the product of the present method which comprises an extruded length of thermoplastic material having a hollow interior defined by a base and a cover with said base having at least one rib extending from said base toward said cover and an end portion having a solid interior filling said end portion.

BRIEF DESCRIPTION OF THE DRAWINGS

FIG. 1 is a perspective view, broken away, of a preferred embodiment of a decorative trim strip of the present invention;

FIG. 2 is a cross-sectional view taken on line 2—2 of FIG. 1;

FIG. 3 is a longitudinal sectional view of the trim strip of FIG. 1;

FIGS. 4–9 are perspective views, broken away, illustrating a preferred embodiment of a method of the present invention in making a trim strip of the present invention; and FIG. 10 is an exploded view illustrating an alternative method step of the present invention.

DETAILED DESCRIPTION OF THE PREFERRED EMBODIMENT

The present invention is particularly suited for forming end of decorative and protective trim strips of the type used on vehicle bodies and is described herein with reference thereto. However, it will be understood by those skilled in the art that the present invention is capable of broader application and could be used for forming ends of elongated moldings or trim strips intended for other uses.

Now referring to the figures, FIG. 1 illustrates a preferred embodiment of a trim strip of the present invention. Trim strip 10 has an extruded elongated body segment 12 with an end portion 14. End portion 14 is illustrated as a "duck bill" shape, however, it will be appreciated that any desired suitable end portion shape can be formed in accordance with the method of the present invention. FIG. 2 illustrates the construction of body segment 12. Thus, body segment 12 comprises a thermoplastic base 16 and thermoplastic cover 18. Cover 18 can have a skin 20 which comprises a pigmented or otherwise desirable finish appearance. It is contemplated that body segment 12 will be extruded of a thermoplastic material such as polyvinyl chloride. Extending upwardly from base 16 are a plurality of supporting ribs 22. Ribs 22 are unitary with base 16 and extend upwardly in supporting relationship to cover 20 however, are not unitary with cover 20 but only in supporting relationship thereto. Base 16 has aluminum foil 24 and double side adhesive tape 26 for adhering a trim strip 10 to a supporting surface such as the side of an automotive vehicle. Body segment 12 has a hollow interior 28.

End portion 14 of trim strip 10 is well illustrated in FIG. 3. Thus, end portion 14 has cover 18 with decorative skin 20 thereover. Double sided adhesive tape 26 with aluminum foil 24 extends continuously underneath body segment 12 and end portion 14 for attaching trim strip 10 to a supporting surface. Core 30 fills end portion 14 and cover 18 with decorative skin 20 thereover is formed into the illustrated shape in accordance with a method of the present invention as is described in the following.

FIGS. 4–9 illustrate a preferred embodiment of the method of the present invention. Thus, FIG. 4 illustrates body segment 12 being extruded from die 32. As is shown in FIG. 4, body segment 12 can be coextruded through die 32 and is extruded so that ribs 22 are spaced from cover 20 a distance 34 to provide a gap so that ribs 22 are not in touching or bonding relationship to cover 20 immediately after extrusion. Thus, in accordance with the present invention the first step of the method of the present invention is to provide an elongated extruded body segment 12 having a base and a cover defining a hollow interior and having at least one rib extending from the base toward the cover to be in supporting relationship therewith.

The end of the trim strip of the present invention is then prepared by removing the base from the end portion as is illustrated in FIGS. 5 and 6 and then molding a core into the end portion while forming the skin into the desired shape. Thus, as illustrated in FIG. 5, cutter blades 36 and 38 can be used to cut base 16 and remove base 16 from end portion 14. Thus, cutter blade 36 cuts downwardly as illustrated in FIG. 5 and cutter blade 38 cuts longitudinally along base 16 which can then be removed with unitary ribs 22 from end portion 14. This then provides an intermediate end portion 40 which can be used for the molding step of the present invention.

Prepared end portion 40 is then inserted into mold 42 which is illustrated in section and FIGS. 7, 8 and 9. End portion 40 can be trimmed to provide the desired shape of cover 18 and skin 20 for the molding step. Then as illustrated in FIGS. 8 and 9 then end portion 40 is placed in mold 42 whereupon thermoplastic material 44 is injected into the mold cavity. Thermoplastic material 44 forces cover 18 with skin 20 against the interior surface of mold 42 to thereby shape the thermoplastic cover 18 and skin 20. Thermoplastic material 44 provides a solid core to support the end. Of course, to avoid thermoplastic material 44 from extending into body segment 12 of trim strip 10 a dam or other blocking means can be employed at 46 to "plug" the hollow interior of body segment 12 from end portion 14.

FIG. 10 illustrates an alternative embodiment of the present invention wherein a solid core 48 is first inserted into a prepared end portion 40 which is then placed into mold 42, heated and formed.

While it will be appreciated that the above description relates to preferred embodiments of the present invention, the present invention is subject to variation and modification within the skill of those skilled in the art. Thus, it is intended that the present invention be limited only by the claims appended hereto.

What is claimed is:

1. A method of forming an end of an elongated molding of thermoplastic material, comprising the steps of:

providing an extruded length of thermoplastic material having an end portion, said extruded length having a hollow interior defined by a base and a cover, having a consistent thickness and said base having at least one rib extending from said base toward said cover said rib being disattached from said cover;

removing a portion of said base and at least one rib from said end portion;

enclosing said end portion in a mold chamber with an interior surface corresponding to a desired end portion shape; and filling said mold chamber with material to force said end portion against said interior surface.

2. The method of claim 1 wherein said base and at least one rib portion are removed by cutting away said base portion.

3. The method of claim 2 wherein said at least one rib is extruded unitary with said base.

4. The method of claim 3 wherein said base comprises a material different than said cover.

5. The method of claim 4 wherein said cover is comprised of polyvinyl chloride.

6. The method of claim 4 wherein a solid core is used to fill said mold chamber.

7. The method of claim 4 wherein said mold chamber is filled by injection molding thermoplastic.

8. The method of claim 4 wherein said cover is trimmed to a desired shape before being enclosed in said mold chamber.

* * * * *